Nov. 5, 1940.   F. TOOP   2,220,872
MECHANISM FOR CONVERTING ROTARY MOTION TO RECIPROCATORY MOTION
Original Filed Aug. 9, 1938
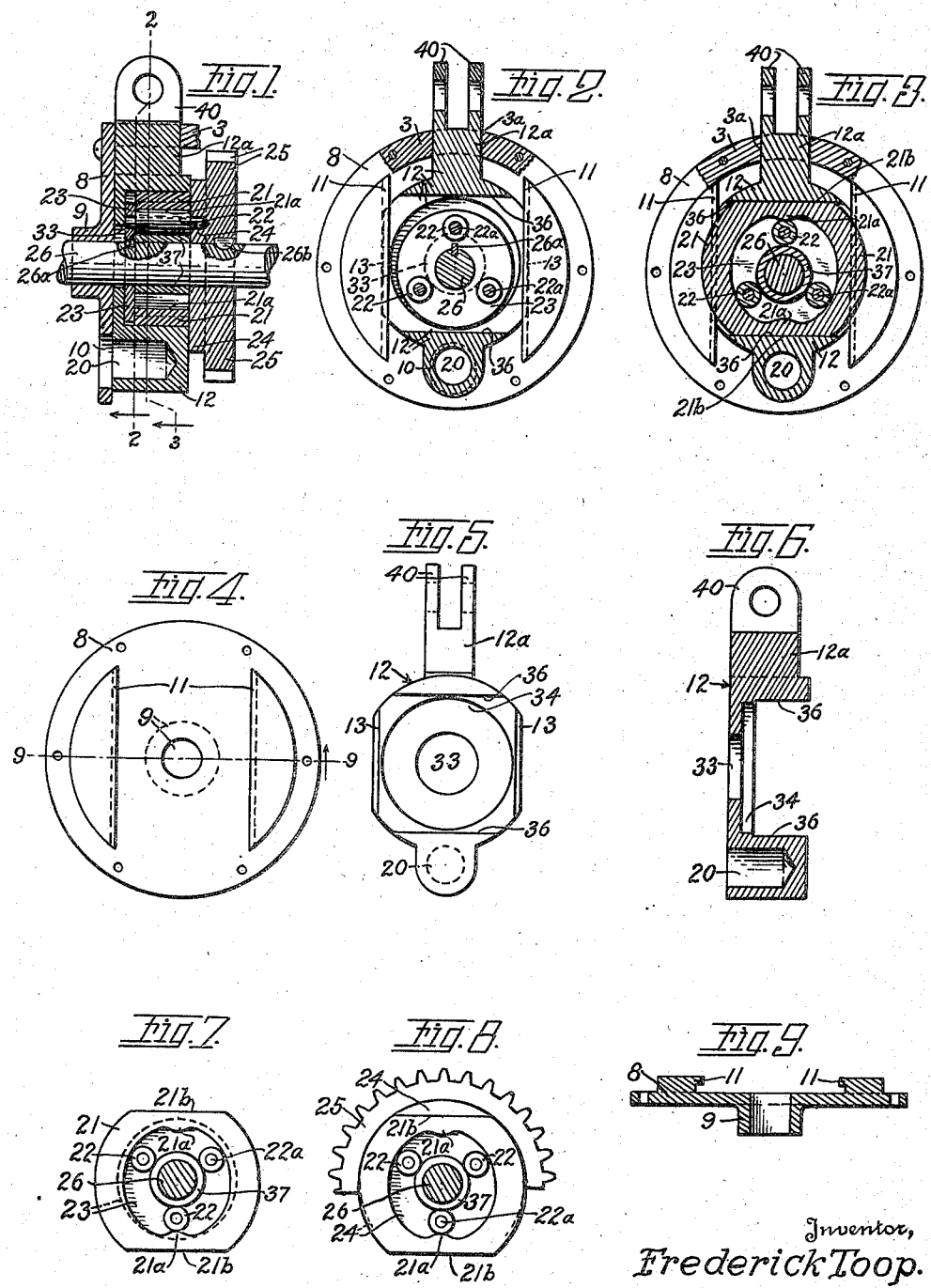
Inventor,
Frederick Toop.

Patented Nov. 5, 1940

2,220,872

UNITED STATES PATENT OFFICE 2,220,872

MECHANISM FOR CONVERTING ROTARY MOTION TO RECIPROCATORY MOTION

Frederick Toop, York, Pa., assignor to Petco, Inc., York, Pa., a corporation of Delaware Original application August 9, 1938, Serial No. 223,807. Divided and this application December 26, 1939, Serial No. 310,925

4 Claims. (Cl. 74—50)

This invention relates to mechanical movements, and especially to an improved mechanism for converting rotary motion to reciprocatory motion.

This mechanism is shown and described in my patent application No. 223,807, filed Aug. 9, 1938, of which the present application is a division.

The primary object of this invention is to provide an important motor-driven means for operating shears and the like; but it is also useful as an element of machines for various purposes.

In the accompanying drawing,

Fig. 1 is a central vertical sectional view taken in the plane of the axis of rotation of the driving shaft.

Fig. 2 is a sectional view taken along the line 2—2 of Fig. 1.

Fig. 3 is a sectional view along the line 2—3 of Fig. 1.

Fig. 4 is an inner-side or rear-side view of a disc or plate which serves as a front closure, an axle bearing and a track or guide for the tool-attaching reciprocator or reciprocative actuator.

Fig. 5 is a rear-side view of the reciprocator or reciprocative actuator.

Fig. 6 is a sectional view taken through the vertical center of Fig. 5.

Fig. 7 is a rear-side view of a detail-assembly of several parts of the mechanism, the rotary elements being shown inverted from the position in which they are shown in Fig. 3, or one of the rollers being on the lower cam-bulge, having pushed the annular cam-member to its lowest position.

Fig. 8 is a front-side view of some of the rotary parts and the cam-member shown in Fig. 7, also a fragment of another one of the rotary parts or driving gear-wheel.

Fig. 9 is a sectional view along the line 9—9 of Fig. 4.

Referring to the drawing in detail, in which similar reference numerals refer to similar parts in the several views, the invention is described in detail as follows:

Parts of the combined casing and guide are shown at 3 and 8, corresponding to like parts of the motor-casing of the patent application No. 223,807, and the combined closure and guide 8 includes a journal-bearing 9, a tool-receiving aperture 10, and parallel guides or gibs 11. This member 8 is removably secured on the member 3 by screws or other appropriate means.

The reciprocatory actuator 12 has parallel edges 13 that are slidably seated between the gibs or guides 11; and it also has therein a tool-receiving cavity 20, a central aperture 33, an annular cavity 34 around the central opening, parallel guides or seats 36, and tool-attaching ears 40.

The cam-member 21 has opposite or upper and lower cam-bulges 21a, also upper and lower parallel edges or surfaces 21b, the latter being seated between the seats or guides 36 so as to have slight sliding motion along the latter. The purpose of this slight sliding movement is to compensate for any slight imperfection of the inner wall of the cam-member 21; so in case the cam-member has no imperfection, the members 12 and 21 may be made integral to a mechanical advantage; so, these two units, when combined as shown in Fig. 3, whether slidingly connected or integrally united, constitute a reciprocative machine element.

Three rollers 22 are journaled on pintles 22a, or formed integrally with such pintles or pivots which are secured or journaled in eccentric openings of a disc 23 and of a circular element 24 of a gear-wheel 25 which latter elements are keyed on a shaft 26 that extends through the central opening of the disc 23 and is also keyed thereto. A roller-supporting sleeve or enlargement 37, journaled on or united with the shaft 26, has a smooth cylindrical surface that serves as a track on which the rollers 22 roll, and which relieves the pintles or pivots 22a from excessive friction and wear.

The unit or member 12 includes a relatively narrow neck or arm 12a that is slidingly fitted in an opening or bearing 3a of the casing 3 and which cooperates with the gibs 11 for preventing the machine element 12—21 from turning about the axis of the driving shaft 26. Therefore, either the part 3a or the parts 11 or the casing, as a whole, constitutes guiding and controlling means for the operation of reciprocative machine element 12—21.

In Fig. 1, it is seen that keys 26a and 26b secure the parts 23 and 24—25 to the shaft 26, thus providing a bearing cage for the rollers 22, so the latter are confined to their isosceles relation to one another, viz., each roller having its axis of rotation at one of the apexes of an isosceles triangle; and by this relation, each roller comes into contact with the upper cam-bulge 21a while the lower cam-bulge 21a is between the other two rollers, thereby raising the machine element 12—21 to its uppermost position; and each roller comes into contact with the lower cam-bulge 21a while the upper cam-bulge 21a is between the other two rollers, thereby lowering the machine element 12—21 to its lowermost position. Moreover, for each revolution of the isosceles group, there is a resultant three reciprocations of the machine element 12—21; so that the invention not only converts the direction of movement, but also multiplies movements, viz., produces three reciprocations for each rotation.

However, the invention is not limited to the triangular isosceles arrangement, for if desired to multiply the reciprocations by five or seven for each rotation, five or seven rollers can be arranged with their axes on the apexes of a pentagon or a heptagon; but for practical results, it is necessary that there shall be an uneven number of the rollers or their mechanical equivalents, or near-equivalents such as sliding cam-contacts in a mechanism that is less expensive, though less durable and efficient than one having rolling cam-contacts.

The tool-attaching parts 20 and 40 do not exhaust the kinds or number of tool attaching or instrument-attaching features that can be employed as parts of the machine-element 12—21 for the various uses to which this mechanical movement can be adapted.

Therefore, this invention is not limited to the precise details of construction and/or arrangement here specified, for the invention is susceptible of numerous changes within the scope of the inventive ideas as implied and claimed.

What I claim as my invention is:

1. In a stroke-multiplying motion-converting mechanical movement, the combination of a machine element mounted for reciprocative strokes and having an opening therein, a power-transmitting shaft mounted for rotation and having a part within said opening, a bearing cage united with said shaft, a plurality of rollers each having a pintle or pivots mounted in said bearing cage and being in parallel relation with said shaft, and an internal cam-member in said opening and around said rollers and having an inwardly protruding cam-bulge therein properly located to be contacted by said rollers successively so as to be pressed by the respective rollers and thereby to effect a plurality of reciprocative motions of said machine element for each rotative cycle of said power-transmitting shaft.

2. In a stroke-multiplying motion-converting mechanical movement, the combination of a machine element that includes a part having an opening therein and which is provided with an inwardly protruding cam-bulge therein and which said machine element is mounted for movement in reciprocative cycles, a power-transmitting shaft mounted for movement in rotative cycles and having a part thereof within said opening of said machine element, a bearing-cage united with said shaft, and rollers journaled in said bearing-cage and in proper positions to move therewith into contact with said cam-bulge successively so as to press against said cam-bulge and thereby effect a plurality of reciprocative cycles of said machine element for each rotative cycle of said power-transmitting shaft.

3. In a stroke-multiplying motion-converting mechanical movement, the combination of a reciprocative machine element having an opening therein and having a cam-bulge within said opening, a rotary machine element which includes a plurality of eccentrically positioned cam-contacting elements within said opening of the reciprocatory machine element and in the proper relation for successively moving against said cam-bulge and thereby effecting a plurality of reciprocatory cycles of said reciprocative machine element for each rotative cycle of said rotary machine element, and a combined bearing and guiding unit in which the said rotary machine element is journalled and in which said reciprocative machine element is slidingly engaged for preventing rotary motion thereof while permitting it to reciprocate in a direction across the axis of said rotary machine element.

4. In a stroke-multiplying motion-converting mechanical movement, the combination of a reciprocative machine element having an opening therein and having a cam-bulge within said opening, a rotary machine element that includes a bearing-cage, and a plurality of rollers journalled in said bearing-cage and having their peripheries respectively in a position to move successively into contact with said cam-bulge and thereby effect a plurality of reciprocative cycles of the reciprocative machine element for each rotative cycle of the rotary machine element, said rollers having peripheral portions normally against said rotary machine element so as to limit the pressure and wear of the journals of said rollers and of said bearing cage.

FREDERICK TOOP.